United States Patent
Verriele

(10) Patent No.: US 9,723,657 B2
(45) Date of Patent: Aug. 1, 2017

(54) METHOD FOR THE THREE-DIMENSIONAL SHAPING OF AN OBJECT FROM A FLEXIBLE CORD, A CORD FOR CARRYING OUT THE METHOD AND AN OBJECT PRODUCED IN THIS WAY

(71) Applicant: Societe Choletaise De Fabrication, Begrolles en Mauges (FR)

(72) Inventor: Olivier Verriele, Begrolles en Mauges (FR)

(73) Assignee: Societe Choletaise De Fabrication, Begrolles en Mauges (FR)

( * ) Notice: Subject to any disclaimer, the term of this patent is extended or adjusted under 35 U.S.C. 154(b) by 410 days.

(21) Appl. No.: 14/371,258

(22) PCT Filed: Nov. 29, 2012

(86) PCT No.: PCT/FR2012/052751
§ 371 (c)(1),
(2) Date: Jul. 9, 2014

(87) PCT Pub. No.: WO2013/107952
PCT Pub. Date: Jul. 25, 2013

(65) Prior Publication Data
US 2014/0346162 A1   Nov. 27, 2014

(30) Foreign Application Priority Data
Jan. 19, 2012  (FR) ...................................... 12 50544

(51) Int. Cl.
*H05B 3/06*  (2006.01)
*H05B 3/56*  (2006.01)
(Continued)

(52) U.S. Cl.
CPC ............... *H05B 3/56* (2013.01); *B29C 51/12* (2013.01); *B29C 51/266* (2013.01); *B29C 51/42* (2013.01); *B29C 53/564* (2013.01); *B29C 53/845* (2013.01); *H01C 3/06* (2013.01); *B29K 2101/12* (2013.01); *B29K 2105/20* (2013.01);
(Continued)

(58) Field of Classification Search
None
See application file for complete search history.

(56) References Cited

U.S. PATENT DOCUMENTS

| | | | | |
|---|---|---|---|---|
| 2,982,932 | A * | 5/1961 | Morey ..................... | H05B 3/56 219/528 |
| 6,454,251 | B1 * | 9/2002 | Fish ........................ | B29C 53/12 156/149 |
| 2002/0088501 | A1 * | 7/2002 | Bruner .................... | D02G 3/32 139/2 |
| 2002/0136870 | A1 * | 9/2002 | Adriaensen .......... | D06N 3/0054 428/198 |

(Continued)

*Primary Examiner* — Joseph M Pelham
(74) *Attorney, Agent, or Firm* — Ipsilon USA, LLP

(57) ABSTRACT

A method of three-dimensionally shaping articles, such as articles that are difficult to transport, includes the following successive steps:
  placing at least one flexible cord (1) on a former (10), the cord (1) incorporating a heating electrical resistance surrounded by at least a first set of yarns of thermoplastic polymer material;
  connecting the flexible cord (1) to an electrical power supply for a given duration to cause the thermoplastic polymer of at least the first set of yarns surrounding the heating resistance to soften, the cord then taking on the shape imposed by the former (10);
  cooling the cord; and
  optionally removing the former (10) in order to obtain the three-dimensional object.

12 Claims, 5 Drawing Sheets

(51) Int. Cl.

| | |
|---|---|
| *H01C 3/06* | (2006.01) |
| *B29C 53/56* | (2006.01) |
| *B29C 53/84* | (2006.01) |
| *B29C 51/12* | (2006.01) |
| *B29C 51/26* | (2006.01) |
| *B29C 51/42* | (2006.01) |
| *B29K 101/12* | (2006.01) |
| *B29K 105/20* | (2006.01) |
| *B29L 31/34* | (2006.01) |
| *B29L 31/00* | (2006.01) |

(52) U.S. Cl.
CPC .............. *B29K 2995/0007* (2013.01); *B29K 2995/0016* (2013.01); *B29L 2031/3462* (2013.01); *B29L 2031/779* (2013.01); *H05B 2203/017* (2013.01); *H05B 2203/033* (2013.01)

(56) References Cited

U.S. PATENT DOCUMENTS

| | | | | |
|---|---|---|---|---|
| 2002/0182961 | A1* | 12/2002 | Clercq | B29C 70/22 442/316 |
| 2002/0193023 | A1* | 12/2002 | Adriaensen | B29C 70/26 442/52 |
| 2004/0166299 | A1* | 8/2004 | Haislet | D02G 3/48 428/292.1 |
| 2004/0229533 | A1* | 11/2004 | Braekevelt | B32B 15/08 442/6 |
| 2005/0042412 | A1* | 2/2005 | Bruner | D02G 3/32 428/92 |
| 2010/0035000 | A1* | 2/2010 | Kirth | A44C 17/02 428/35.2 |
| 2015/0083709 | A1* | 3/2015 | Pepin | H05B 3/342 219/545 |

* cited by examiner

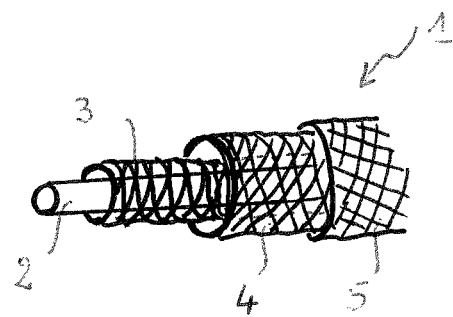
Fig. 1
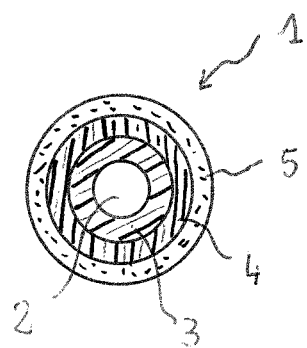 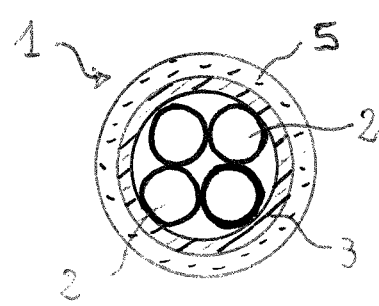
Fig. 2 Fig. 3

U.S. Patent Aug. 1, 2017 Sheet 2 of 5 US 9,723,657 B2
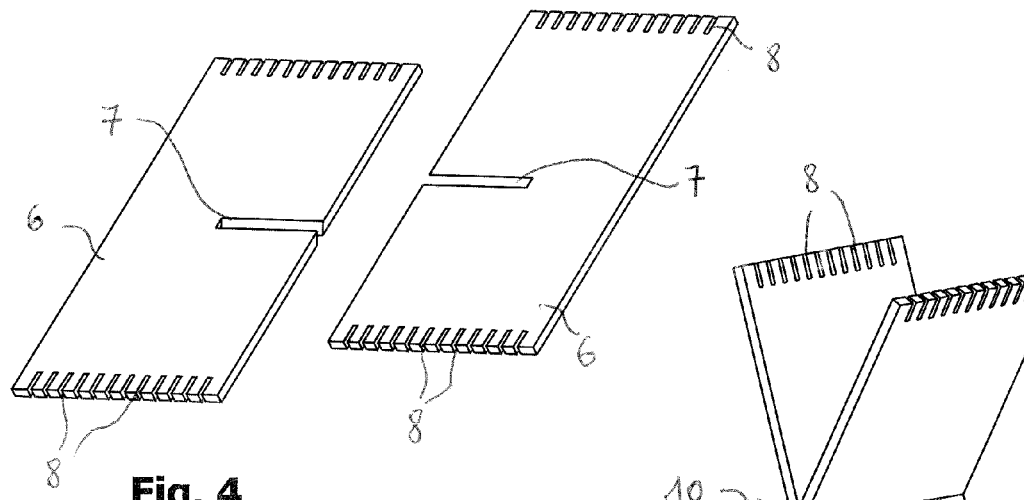
Fig. 4
Fig. 5
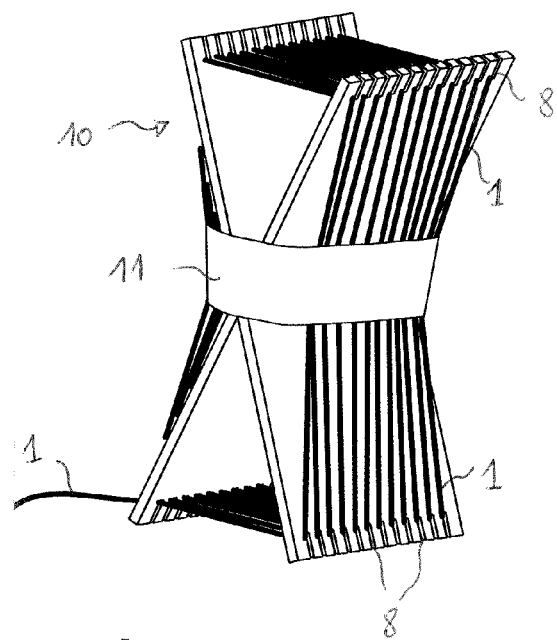
Fig. 6
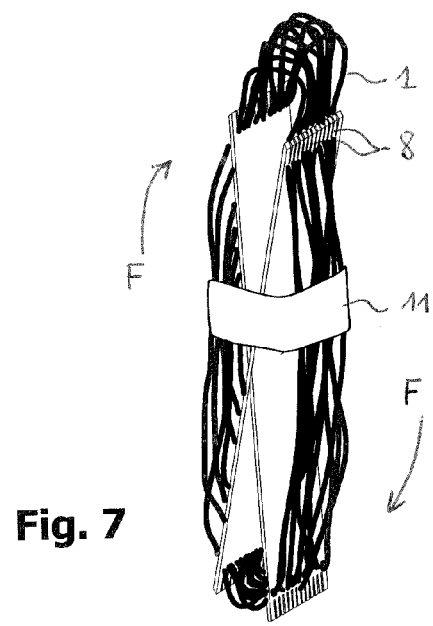
Fig. 7

METHOD FOR THE THREE-DIMENSIONAL SHAPING OF AN OBJECT FROM A FLEXIBLE CORD, A CORD FOR CARRYING OUT THE METHOD AND AN OBJECT PRODUCED IN THIS WAY

The present invention relates to the method of three-dimensionally shaping articles, such as articles that are difficult to transport, to equipment for performing the method, and to articles as made in this way.

With the increase in mail-order selling, there arises a problem of the bulk of objects that are to be shipped: size, volume, and weight can all be obstacles to shipping or can lead to transportation costs that are exorbitant compared with the purchase price of the article itself.

In order to reduce these costs, articles can be delivered in kit form for self-assembly. The present trend is to enable articles to be created or assembled at home using materials or basic elements that are simple, and possibly suitable for being prefabricated. Very often, assembling articles requires the use of adhesive or screws.

An object of the present invention is to propose a method of making articles that is simple, that is based on elements that are compact, and in particular that are suitable for delivering by mail, the method possibly being applied to making three-dimensional articles of large size such as pieces of furniture, e.g. seats.

Furthermore, certain articles are difficult to transport or to need to be taken to locations that are difficult of access (in mountains, underground, . . . ). Another object of the present invention is thus to propose a method enabling a user to make articles on site in locations that are difficult of access.

Another object of the invention is to propose a method of making articles with a minimum of raw materials, without requiring special tooling, and without requiring adhesive material.

Another object of the invention is to propose a method of shaping articles that is fast, so that the user can use an article shortly after making it.

To this end, the present invention provides a method of three-dimensionally shaping articles such as articles that are difficult to transport, the method being characterized in that it is performed using flexible cord(s) and comprises the following successive steps:

placing at least one flexible cord on a support element such as a former, said cord incorporating a heating electrical resistance surrounded by at least a first set of yarns of thermoplastic polymer material;

connecting the flexible cord to an electrical power supply for a given duration to cause the thermoplastic polymer of at least the first set of yarns surrounding the heating resistance to soften, the cord then taking on the shape imposed by the support element;

cooling the cord; and optionally removing the support element in order to obtain the three-dimensional object independently of the support element.

The base material is solely a flexible cord that is relatively compact, enabling a variety of articles to be made in an infinite variety of shapes, colors, appearances, and dimensions.

The term "flexible cord" is used herein to mean any element of elongate shape that incorporates a heating electrical resistance and at least a first set of thermoplastic yarns, which yarns may be braided or woven, and covered in a sheath of tubular shape (like a shoelace) or substantially plane (like a strap) made of braided or woven yarns.

The support element may be a former of any shape, e.g. enabling the cord to be wound thereabout, or an attachment system, e.g. for making an article of elongate shape such as an access ladder.

Making the article takes only a few minutes, corresponding to putting it into place on the support, heating the cord, and then allowing it to cool. There is no need to put any adhesive or other substances into place that might dirty or mark the premises where assembly takes place, nor is there any need for other specific tools, nor is there any need for assembly means other than connection to an electrical power supply. The article can thus be made cleanly and can be put into use quickly. It is also made with a minimum of raw material.

Once the support has been withdrawn, the erected article may be constituted solely by said cord(s), thereby giving it the appearance of being light and airy, and the segments of said cord(s) may be spaced apart from one another. The article is stable, even if adjacent cord segments are spaced apart from one another without any junction zones.

The present invention also provides said flexible cord for performing the above-described method, which flexible cord is characterized in that it comprises a heating electrical resistance surrounded by at least a first set of yarns (e.g. a first layer of braided or woven yarns) made of thermoplastic polymer material, said first set of yarns itself being surrounded by a protective sheath, preferably also made of yarns. As mentioned above, the yarns of the sheath may be woven or braided.

The term "surrounded" is used herein to mean that the electrical resistance acts as a core for the first set of thermoplastic yarns (which are braided, woven, or lapped thereabout) or that the electrical resistance is braided or woven with the thermoplastic yarns so that the yarns are in contact with said electrical resistance, thereby enabling them to be soften when the resistance is passing electricity. The advantages of a set of yarns, in particular in woven, braided, or lapped form compared with a continuous layer of thermoplastic material are mainly the flexibility and the pliability of the cord, and also the multiple ways in which such a surrounding can be prepared in terms: of yarn thickness; of the tightness of said yarn for constituting the braid, the weaving, or the lapping; of the potential for combining yarns of different kinds; and of the final thickness of the set, depending on the number of passes of the yarn(s).

In an advantageous embodiment, the electrical resistance is made up of at least one metal wire constituting the core of the first set of thermoplastic polymer yarns that are assembled together by braiding or weaving.

Depending on the diameter of the metal wire and on its nature, it is possible in a variant to provide a plurality of metal wires in the core or braided with the first thermoplastic yarns of the first set of yarns. These wires may be arranged in parallel, along the axis of the cord, or they may be twisted together.

Advantageously, the flexible cord includes at least one intermediate layer of braided or woven thermoplastic polymer yarns surrounding a set or a plurality of sets formed by the electrical resistance and the first set of thermoplastic yarns.

The first thermoplastic yarns (e.g. the first braid) for softening during heating can thus be separated from the outer protective sheath. Depending on the size desired for the final diameter of the cord, the cord may thus have a stack of several intermediate coaxial layers of braided or woven yarns. The intermediate layers also serve to prevent the internal electric wire from breaking while the cord is being handled, in particular while it is being transported or while it is being put into position on the former.

The metal wire forming the electrical resistance is a wire selected from stainless steel, steel, iron, copper, and carbon.

The thermoplastic polymer constituting the polymer material yarns (which yarns are in contact with the electrical resistance and with the yarns of the intermediate layer(s)) is selected from polyamide, polyester, polypropylene, and polycarbonate. These polymer yarns may present high tenacity. It is not essential for all of the layers to be made of the same kind of polymer. In particular, it is possible to envisage a graduated arrangement, e.g. in terms of ability to withstand high temperatures going from the inside towards the outside of the cord.

The yarns of the protective sheath, preferably braided or woven yarns, are advantageously yarns of linen or cotton, or of other non-meltable materials. The advantage of linen is that it presents good strength and it is insulating; the advantage of cotton is that numerous colors are available. It is also possible to make the outer protective sheath out of glass or carbon fibers, or indeed fibers made of Kevlar, an aromatic polyamide that withstands high temperatures and that presents low thermal conductivity.

The present invention also provides a kit for making a three-dimensional article using the method of the present invention, the kit being characterized in that it comprises at least one flexible cord as described above, and of length sufficient for making said three-dimensional article, connection means for connecting the end of the cord to a transformer or an electrical power supply, and optionally a support element such as a former.

Such a kit can easily be put into a bag and/or can easily be shipped by mail. Its overall size is minimized since the cord can be folded, as can the former which may, for example, be made of a card material.

The present invention also relates to three-dimensional article made up of an arrangement of braided cords arranged in adjacent or crossing segments so as to form at least one bearing surface, the cord being as described above and the article being made using the above-described method.

The article may be constituted solely by a cord as described above. It is thus very light in weight, strong, and made using a minimum of material.

Among said articles, and without this list being limiting, it is possible to mention pieces of furniture such as seats, escape ladders, . . . .

The invention is described below in greater detail with the help of illustrative examples given with reference to the figures, in which:

FIG. 1 is an exploded diagrammatic side view of a cord example enabling the method of the present invention to be performed;

FIG. 2 is a diagrammatic cross-section of the FIG. 1 cord;

FIG. 3 is a diagrammatic cross-section of a variant of the cord of the invention;

FIG. 4 shows the parts constituting an example of a former;

FIG. 5 is a perspective view of the FIG. 4 former in the assembled state;

FIG. 6 is a perspective view of the cord surrounding the former;

FIG. 7 is a perspective view of a folded cord-and-former assembly;

Figures 8, 9:
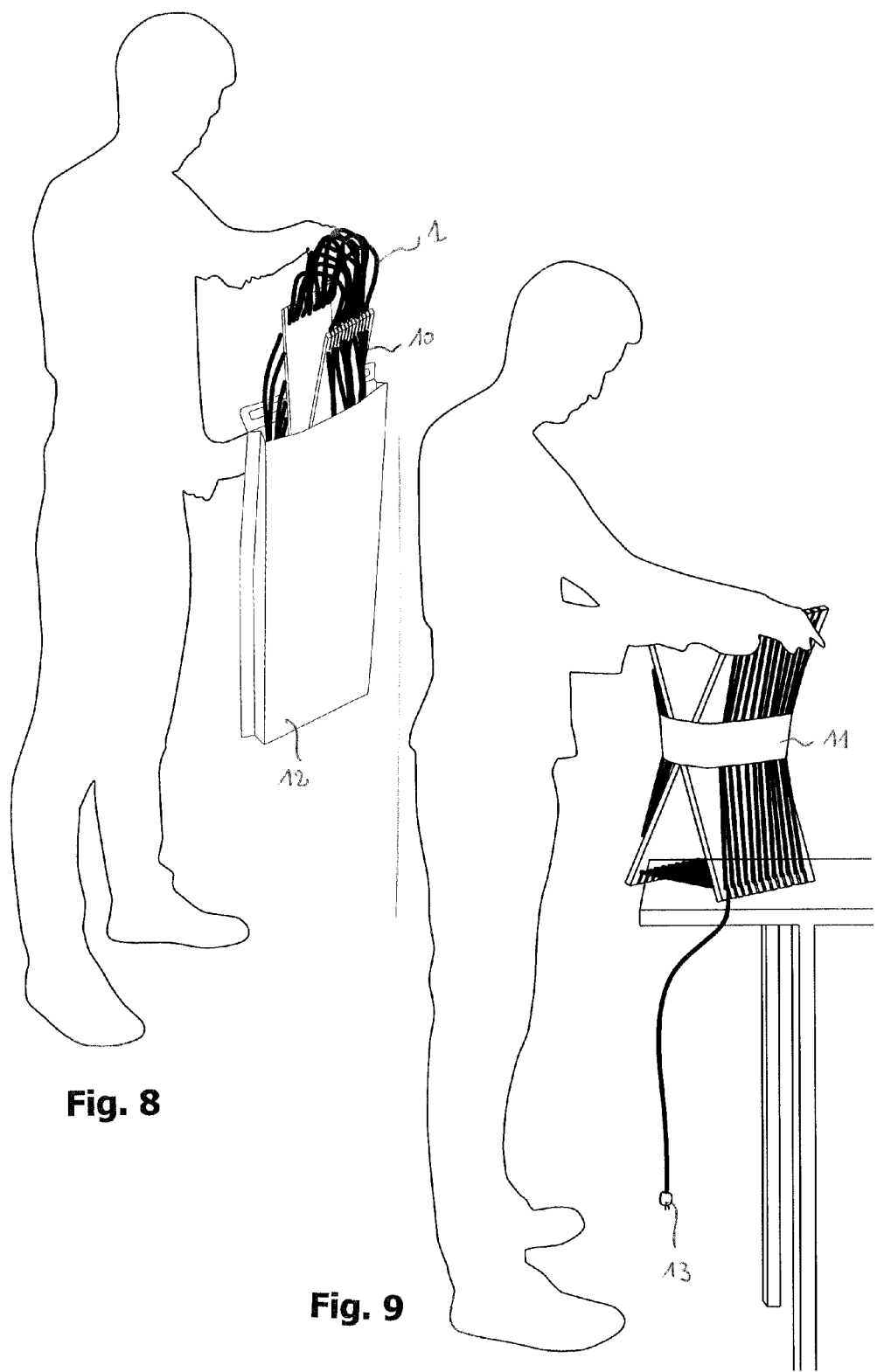
FIG. 8 shows the former-and-cord assembly housed in a bag.
FIG. 9 shows the former-and-cord assembly being unfolded.

With reference to the figures, the cord 1 of the present invention comprises a core 2 of metal material covered by a first set 3 of braided yarns, referred to as the first braid, an intermediate layer 4 of braided yarns, referred to as the intermediate braid, with that assembly being surrounded by an outer protective sheath 5 of tubular shape, as can be seen in FIG. 1, which shows an exploded view of a cord.

FIG. 2 is a diagrammatic cross-section view of the cord shown in FIG. 1, the material constituting the first assembly 3 and the material constituting the intermediate layer 4 possibly being different materials.

The outer protective sheath 5 is preferably also made of braided yarns, such as linen yarns or cotton yarns so as to provide an external appearance that is agreeable for the user, so as to provide thermal and electrical insulation, and so as to hold the polymer layers in place inside said cord.

In another variant, shown in diagrammatic cross-section in FIG. 3, the cord 1 of the invention has a plurality of metal wires 2 arranged axially, being parallel or twisted together (possibly also with yarns of thermoplastic polymer). This plurality of metal wires 2 is enclosed in a first set 3 of braided yarns, which set is surrounded by a protective sheath 5. One or more intermediate layers may be provided between the first braid of the first set 3 and the protective sheath 5.

The core 1, with the variants that are shown in FIGS. 1 to 3 being non-limiting examples, constitutes the base element of the article to be made by the method of the present invention. FIGS. 4 to 11 show the main steps of the method.

In this example, a former 10 is constituted by two card plates 6 having the same shape, each being provided with a middle slot 7, enabling the plates to be mutually engaged so as to form an X as shown in FIG. 5. The ends of each of the plates 6 present respective successions of notches 8 suitable for receiving the cord 1 by the cord being wound onto the unfolded former 10 (see FIG. 6).

By way of example, the winding of the core 1 around the former 10 may be tightened in its central portion by a decorative belt 11, as shown diagrammatically in FIG. 6.

After the cord 1 has been put into place on the former 10, the former can be folded by moving the two card plates 6 towards each other, as represented by arrows F in FIG. 7. The assembly can thus be flattened and housed in a bag 12 for transport purposes, as shown in FIG. 8. Such a transport bag enables the kit comprising the former, the cord wound on said former, and the electrical connection means 13 to be transported while flat, and to be shipped, e.g. by mail.

Figure 10:
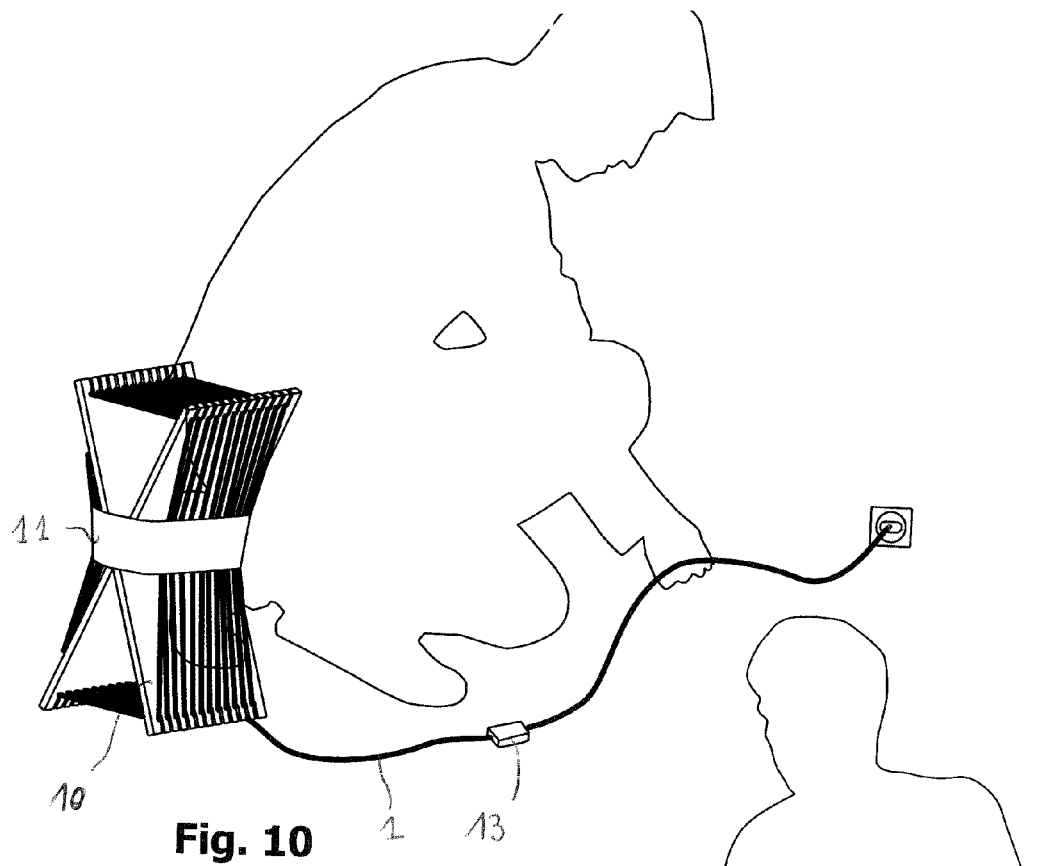
FIG. 10 shows the unfolded former-and-cord assembly connected to an electrical power outlet.

When the purchaser receives the kit at home, and after extracting it from the bag 12, the purchaser unfolds the former 10 (see FIG. 9) and connects the cord 1 to an electrical power supply (see FIG. 10).

Figure 11:
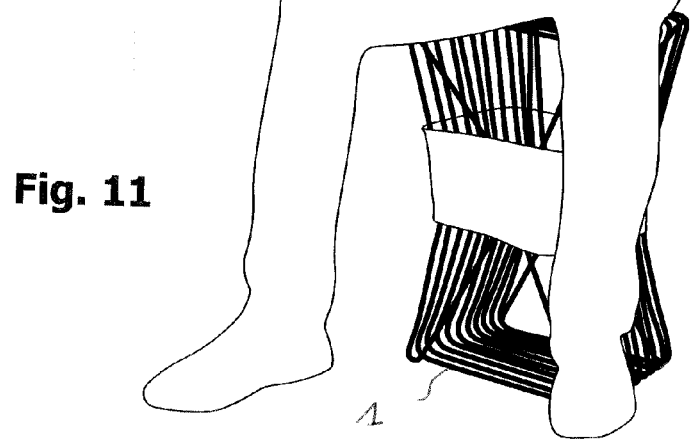
FIG. 11 shows the resulting final seat suitable for use by the purchaser.

After electricity has been passed for a few seconds or minutes along the metal wire acting as an electrical resistance in the core of the cord, at least the first set 3 of braided yarns made of thermoplastic polymer material has softened, thereby further relaxing the cord as a whole so that it can easily take on the shape imposed by the former, and possibly by the belt 11. After the cord has cooled down and stiffened, the former may be removed and the stiffened cord can be used as a seat, as shown in FIG. 11.

Figure 12:
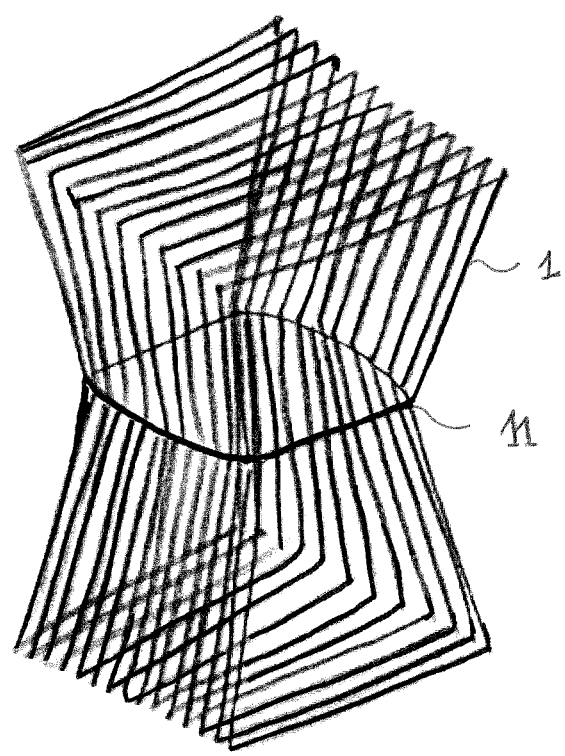
FIGS. 12 and 13 are perspective diagrams showing two variant embodiments of the seat shown in FIG. 11.
Figure 13:
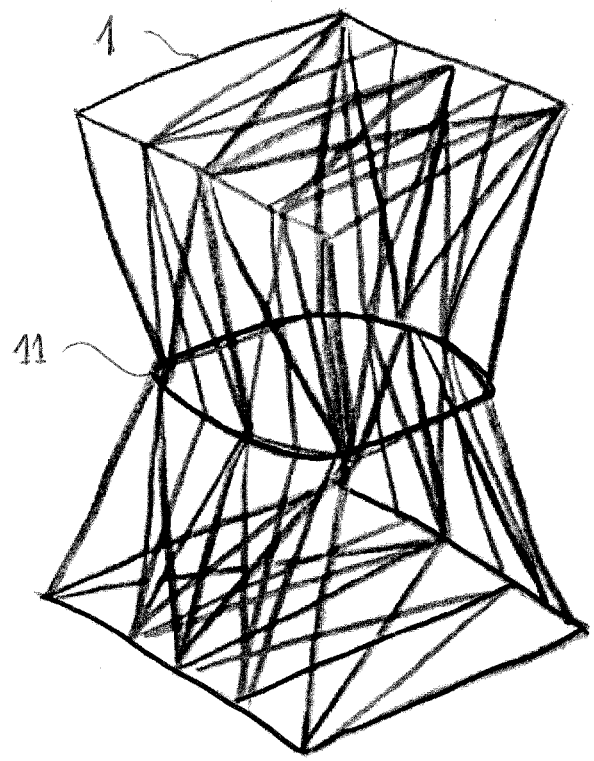

FIGS. 12 and 13 are sketches showing two possible arrangements from among a multitude of possible arrangements for distributing the cord elements. Once the three-dimensional object has been made, it can serve as in the example shown as a seat, or more specifically as a stool.

As an example of implementing the method of the invention, the cord is made using three stainless steel metal wires having a diameter of 0.28 millimeters (mm) that are twisted together so as to form the core of a first set of braided yarns of polypropylene 1000, which is itself covered in another braid, likewise made of polypropylene, constituting an intermediate layer 4. The size of this assembly comprising the core, the first braid, and the second braid presents an outside diameter of about 5 mm. This assembly is then covered in a braid of natural linen so as to present a final diameter of 6.50 mm. After being installed on the former and after being connected to an electrical power supply at 20 volts (V) and 3 amps (A), the applied heating time should lie in the range 2 minutes (min) to 5 min so as to enable the entire cord to soften. After cooling for about 3 min and then removing the former, the shaped cord on its own is found to be sufficiently stiff to serve as a seat for the operator.

The invention claimed is:

1. A method of three-dimensionally shaping articles, the method being characterized in that it is performed using flexible cord(s) and comprises the following successive steps:
    winding at least one flexible cord around a support element, said cord incorporating a heating electrical resistance surrounded by at least a first set of yarns of thermoplastic polymer material, and said first set of yarns itself being surrounded by a protective sheath, and said protective sheath being made of yarns of linen, cotton, glass or carbon fibers;
    connecting the flexible cord to an electrical power supply for a given duration to cause the thermoplastic polymer of at least the first set of yarns surrounding the heating resistance to soften, the cord then taking on the shape imposed by the support element;
    cooling the cord; and obtaining the three dimensional object;
    optionally removing the support element in order to obtain the three-dimensional object independently of the support element.

2. A flexible cord for performing the method of claim 1, further comprising a heating electrical resistance surrounded by at least a first set of yarns of thermoplastic polymer material, said first set of yarns itself being surrounded by a protective sheath, and said protective sheath being made of yarns of linen, cotton, glass or carbon fibers.

3. A flexible cord according to claim 2, wherein the electrical resistance is made up of at least one metal wire constituting the core of the first set of thermoplastic polymer yarns that are assembled together by braiding or weaving.

4. A flexible cord according to claim 2, wherein said flexible cord includes at least one intermediate layer of braided or woven thermoplastic polymer yarns surrounding a set or a plurality of sets formed by the electrical resistance and the first set of thermoplastic yarns.

5. A flexible cord according to claim 3, wherein the metal wire forming the electrical resistance is a wire selected from stainless steel, steel, iron, copper, and carbon.

6. A flexible cord according to claim 2, wherein the thermoplastic polymer constituting the polymer material yarns is selected from polyamide, polyester, polypropylene, and polycarbonate.

7. A flexible cord according to claim 2, wherein the yarns of the protective sheath are braided or woven yarns.

8. A kit for making a three-dimensional article using the method of claim 1, said kit comprising at least one flexible cord which comprises a heating electrical resistance surrounded by at least a first set of yarns of thermoplastic polymer material, said first set of yarns itself being surrounded by a protective sheath, said cord being of length sufficient for making said three-dimensional article, connection means for connecting the end of the cord to a transformer or an electrical power supply, and a support element.

9. A three-dimensional article formed by arranging at least one cord arranged in adjacent or crossing segments so as to form at least one bearing surface, the cord being in accordance with claim 2.

10. An article according to claim 9, wherein said article is constituted solely by said cord.

11. A flexible cord according to claim 3, wherein said flexible cord includes at least one intermediate layer of braided or woven thermoplastic polymer yarns surrounding a set or a plurality of sets formed by the electrical resistance and the first set of thermoplastic yarns.

12. A flexible cord according to claim 4, wherein the metal wire forming the electrical resistance is a wire selected from stainless steel, steel, iron, copper, and carbon.

* * * * *